United States Patent
Lechaftois et al.

(10) Patent No.: US 12,462,848 B1
(45) Date of Patent: Nov. 4, 2025

(54) SYSTEMS AND METHODS FOR DYNAMICALLY GENERATING MUSIC FOR VIDEOS

(71) Applicant: GoPro, Inc., San Mateo, CA (US)

(72) Inventors: François Lechaftois, San Mateo, CA (US); Emmanuel Simon, San Mateo, CA (US); Mejed El Jabri, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 19 days.

(21) Appl. No.: 18/612,683

(22) Filed: Mar. 21, 2024

(51) Int. Cl.
*G11B 27/036* (2006.01)

(52) U.S. Cl.
CPC ................ *G11B 27/036* (2013.01)

(58) Field of Classification Search
CPC .................................................. G11B 27/036
See application file for complete search history.

(56) References Cited

U.S. PATENT DOCUMENTS

2017/0017855 A1* 1/2017 Karsh ................ H04N 23/683
2018/0295427 A1* 10/2018 Leiberman ......... H04N 21/8456

* cited by examiner

*Primary Examiner* — Thai Q Tran
*Assistant Examiner* — Jose M Mesa
(74) *Attorney, Agent, or Firm* — Esplin & Associates, PC

(57) ABSTRACT

Music tracks may be selected to create an accompaniment for a video that matches the characteristics of the video. Video characteristics may be used to generate personalized soundtracks to provide more impactful/engaging video edits. Video characteristics may be used to create the arrangement of the music to provide accompaniment for the video. Music tracks may be associated with different music elements (e.g., intro, outro, verse, chorus, bridge, drop, break, hook, refrain), and different parts of the video may be assigned to particular music elements based on the characteristics of the video. Music track(s) corresponding to the assigned music elements may be selected for different parts of the video. The music tracks may be automatically selected to generate an accompaniment that matches the video. Effects may be added to the video and/or the selected music tracks to highlight moments (e.g., interesting moments, high action moments) in the video.

20 Claims, 5 Drawing Sheets

SYSTEMS AND METHODS FOR DYNAMICALLY GENERATING MUSIC FOR VIDEOS

FIELD

This disclosure relates to dynamically generating music for videos by selecting music tracks based on video characteristics.

BACKGROUND

A video may be edited to provide a modified view of the video. A video edit may include music to provide sound during playback of the video edit. Editing a video to music may involve adapting the content in the video to match the characteristics (e.g., beat, melody, intensity) of the music. Using the same music to generate video edits may result in repetitive video edits.

SUMMARY

This disclosure relates to dynamically generating music for videos. Video information, characteristic information, music track information, and/or other information may be obtained. The video information may define a video. The video may have a progress length. The video may include visual content viewable as a function of progress through the progress length of the video. The characteristic information for the video may define one or more characteristics of the video. The music track information may define a set of music tracks. Multiple music tracks may be selected from the set of music track for inclusion in an accompaniment for the video. The multiple music tracks may be selected from the set of music track based on the characteristic(s) of the video and/or other information. The accompaniment for the video may be generated to include the selected music tracks.

A system for dynamically generating music for videos may include one or more electronic storages, one or more processors, and/or other components. An electronic storage may store video information, information relating to a video, information relating to visual content, characteristic information, information relating to characteristic of the video, music track information, information relating to a set of music tracks, information relating to music tracks, information relating to selection of music track, information relating to an accompaniment for the video, and/or other information.

The processor(s) may be configured by machine-readable instructions. Executing the machine-readable instructions may cause the processor(s) to facilitate dynamically generating music for videos. The machine-readable instructions may include one or more computer program components. The computer program components may include one or more of a video component, a video characteristic component, a music track component, a selection component, a generation component, and/or other computer program components.

The video component may be configured to obtain video information and/or other information. The video information may define a video. The video may have a progress length. The video may include visual content viewable as a function of progress through the progress length of the video.

The video characteristic component may be configured to obtain characteristic information for the video and/or other information. The characteristic information for the video may define one or more characteristics of the video. In some implementations, the characteristic(s) of the video may include motion intensity of an image capture device during capture of the video. The motion intensity of the image capture device during the capture of the video may be determined based on values of acceleration of the image capture device during the capture of the video and/or other information.

The music track component may be configured to obtain music track information and/or other information. The music track information may define a set of music tracks. In some implementations, the set of music tracks may include looping music tracks. In some implementations, an individual music track may be associated with a music element.

The selection component may be configured to select multiple music tracks from the set of music tracks. The multiple music tracks may be selected for inclusion in an accompaniment for the video. The multiple music tracks may be selected based on the characteristic(s) of the video and/or other information.

In some implementations, selection of the multiple music tracks from the set of music tracks based on the characteristic(s) of the video may include: assignment of music elements to different parts of the progress length of the video based on the characteristic(s) of the video corresponding to the different parts of the progress length of the video; and selection of a given music track for a given part of the progress length of the video based on a given music element assigned to the given part of the progress length of the video and/or other information.

In some implementations, the given music track for the given part of the progress length of the video may be selected further based on a length of the given part of the progress length of the video.

In some implementations, the selection of the given music track for the given part of the progress length of the video may include: assignment of the given music track for the given part of the progress length of the video; assignment of a duration for which the given music track is to be played; and assignment of an intensity with which the given music track is to be played.

The generation component may be configured to generate the accompaniment for the video. The accompaniment for the video may be generated to include the selected music tracks and/or other music tracks. In some implementations, one or more effects may be included in the video and/or the accompaniment for the video based on the characteristic(s) of the video and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
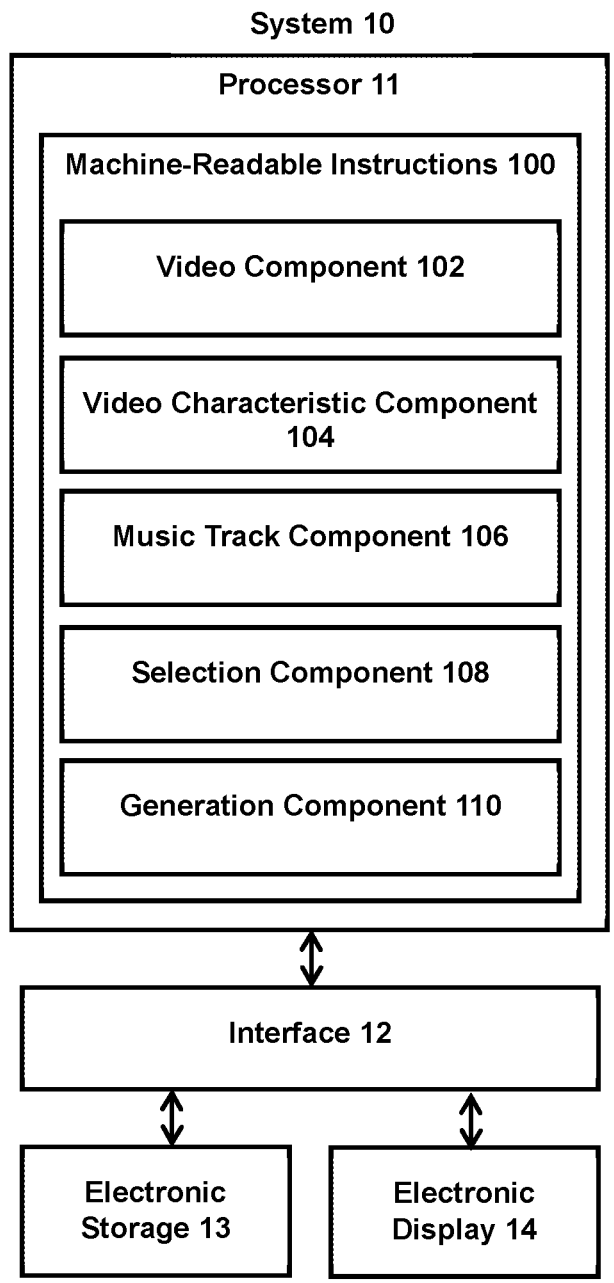
FIG. 1 illustrates an example system for dynamically generating music for videos.

FIG. 1 illustrates a system 10 for dynamically generating music for videos. The system 10 may include one or more of a processor 11, an interface 12 (e.g., bus, wireless interface), an electronic storage 13, an electronic display 14, and/or other components. Video information, characteristic information, music track information, and/or other information may be obtained by the processor 11. The video information may define a video. The video may have a progress length. The video may include visual content viewable as a function of progress through the progress length of the video. The characteristic information for the video may define one or more characteristics of the video. The music track information may define a set of music tracks. Multiple music tracks may be selected by the processor 11 from the set of music track for inclusion in an accompaniment for the video. The multiple music tracks may be selected from the set of music track based on the characteristic(s) of the video and/or other information. The accompaniment for the video may be generated by the processor 11 to include the selected music tracks.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, characteristic information, information relating to characteristic of the video, music track information, information relating to a set of music tracks, information relating to music tracks, information relating to selection of music track, information relating to an accompaniment for the video, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, characteristic information, information relating to characteristic of the video, music track information, information relating to a set of music tracks, information relating to music tracks, information relating to selection of music track, information relating to an accompaniment for the video, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video may be edited to provide a modified view of the video. A video edit may include music to provide sound during playback of the video edit. Impact/engagement of the video edit may be increased when the video playback matches the music playback. Thus, a video may be edited to match the characteristics of the music. However, such video editing may result in generation of repetitive video edits. For example, using the same song as the soundtrack for different videos may result in the same type of edits being made to the different videos.

The present disclosure enables generation of music to match the video in generating video edits. Rather than adapting the content (e.g., footage) of the video to match the music, music tracks may be selected to create an accompaniment for the video that matches the characteristics of the video. The video characteristics (e.g., from video content analysis) may be used to generate personalized soundtracks to provide more impactful/engaging video edits. The video characteristics may be used to create the arrangement of the music to provide accompaniment for the video. Music tracks may be associated with different music elements (e.g., intro, outro, verse, chorus, bridge, drop, break, hook, refrain), and different parts of the video may be assigned to particular music elements based on the characteristics of the video. One or more music tracks corresponding to the assigned music elements may be selected for different parts of the video. The music tracks may be automatically selected to generate an accompaniment that matches the video. Effects may be added to the video and/or the selected music tracks and/or the video to highlight moments (e.g., interesting moments, high action moments) in the video.

The processor 11 (or one or more components of the processor 11) may be configured to obtain information to facilitate dynamically generating music for videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamically generating music for videos. The machine-readable instructions 100 may include one or more computer program components. The machine-readable instructions 100 may include one or more of a video component 102, a video characteristic component 104, a music track component 106, a selection component 108, a generation component 110, and/or other computer program components.

The video component 102 may be configured to obtain video information and/or other information. In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. A video may include content (e.g., footage) captured by one or more image capture device. A video may include the original content captured by image capture device(s). A video may include modification of the content captured by image capture device(s). For example, a video may include a video clip captured by an image capture device or a video edit of one or more video clips. A video edit may refer to an arrangement and/or manipulation of one or more video clips for playback. A video edit may define which parts of the video clips are included for playback and/or the orders in which parts of the video clips are to be presented on playback.

The video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

Content of a video may be referred to as video content. Video content may include visual content, audio content, and/or other content. For example, video content may include visual content viewable as a function of progress through the progress length of the video, audio content playable as a function of progress through the progress length of the video, and/or other content that may be played back as a function of progress through the progress length of the video. Video content may include metadata relating to the video. Metadata relating to the video may include information on capture of the video (e.g., location and/or motion of the image capture device during capture of the video, capture parameters such as shutter speed and white balance), editing of the video (e.g., moments of the original footage that have been selected for inclusion in the video, modification of visual content and/or audio content), characteristics of the video (e.g., brightness of the video, amount and/or direction of motion in the video, objects depicted within the video, activity depicted within the video), and/or other information relating to the video.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The video information define a video by characterizing, describing, identifying, quantifying, reflecting, and/or otherwise defining the video. The video information may define a video by including information that defines one or more content, qualities, attributes, features, and/or other aspects of the video/video content. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

The video information may be stored within a single file or multiple files. For example, the video information defining a video may be stored within a video file, multiple video files, a combination of different files (e.g., a visual file and an audio file), and/or other files. The video information may be stored in one or more formats or containers.

The video characteristic component 104 may be configured to obtain characteristic information for the video and/or other information. In some implementations, the video characteristic component 104 may be configured to identify the characteristic information associated with the video and obtain the associated characteristic information. In some implementations, the characteristics information for the video may be stored with the video. For example, the characteristic information for the video may be stored as metadata of the video, and the video characteristic component 104 may be configured to obtain the characteristic information by extracting the characteristic information from the metadata of the video. In some implementations, the characteristic information may be generated by one or more motion sensors of the image capture device that captured the video. For instance, the characteristic information may be generated by one or more accelerometers and/or one or more inertial measurement units of the image capture device during capture of the video. In some implementations, the characteristic information may be obtained based on analysis of the video. The visual content, the audio content, the metadata, and/or other content of the video may be analyzed to obtain the characteristic information.

The characteristic information for the video may define one or more characteristics of the video. A characteristic of the video may refer to one or more of feature, quality, quantity, trait, property, value, measurable factor, and/or other information relating to the video. A characteristic of the video may include qualitative and/or quantitative characteristic of the video. A characteristic of the video may refer to a characteristic of the capture of the video (capture characteristic), a characteristic of the content of the video (content characteristic), and/or other characteristic of the video.

A capture characteristic of the video may refer to a characteristic of the image capture device during capture of the video. A capture characteristic of the video may include a temporal characteristic (e.g., date and/or time of video capture), a spatial characteristic (e.g., location of video capture), an environmental characteristic (e.g., environment condition during video capture), a motion characteristic (e.g., speed, acceleration, direction of gravity, change in orientation of the image capture device during video capture), a capture setting characteristic (e.g., settings of the image capture device used during video capture, capture parameters), and/or other capture characteristic.

A content characteristic of the video may refer to a characteristic of the content of the video. A content characteristic of the video may include a visual characteristic (e.g., color, histogram, contrast, brightness, resolution, framerate, objects depicted within the visual content, activities depicted within the visual content), an audio characteristic (e.g., amount and/or type of sound, keywords detected within the audio content, energy of sounds captured within the audio content), and/or other content characteristic. Other characteristics of the video are contemplated.

For example, the characteristic(s) of the video may include motion intensity of an image capture device during capture of the video. The motion intensity of the image capture device during capture of the video may refer to a measure of how the image capture device moved during video capture. The motion intensity of the image capture device may be determined based on image capture device orientation, changes in image capture device orientation, speed of the image capture device, acceleration of the image capture device, direction of gravity on the image capture device, GPS location of the image capture device, and/or other information relating to motion of the image capture device during video capture.

For example, the motion intensity of the image capture device during the capture of the video may be determined based on values of acceleration of the image capture device during the capture of the video and/or other information. The values of the motion intensity for different moments in the progress length of the video may be determined based on the values of acceleration of the image capture device during the capture of the video. For instance, the values of the motion intensity for different moments in the progress length of the video may be calculated as the square root of the sum of squares of acceleration values along three orthogonal axes ($\sqrt{Acc\_x^2 + Acc\_y^2 + Acc\_z^2}$). The values of the motion intensity for different moments in the progress length of the video may be determined based on other information relating to movement of the image capture device (e.g., output from gyroscope/inertial measurement unit, information on direction of gravity on the image capture device, GPS location). Other computations of the motion intensity of the image capture device are contemplated.

The characteristic(s) of the video may include motion types of an image capture device during capture of the video. The motion types may refer to the types of motion experienced by the image capture device during video capture. Example motion types include moving, not moving, steady motion, shaky motion, jump, crash, and turn. Other motion types are contemplated. The motion types of the image capture device may be determined based on image capture device orientation, changes in image capture device orientation, speed of the image capture device, acceleration of the image capture device, direction of gravity on the image capture device, GPS location of the image capture device, and/or other information relating to motion of the image capture device during video capture.

The characteristic information for the video may define a characteristic of the video by characterizing, describing, identifying, quantifying, reflecting, and/or otherwise defining the characteristic of the video. The characteristic information for the video may define one or more characteristics of the video by including information that defines one or more content, qualities, attributes, features, and/or other aspects of the characteristic(s) of the video. For example, the characteristic information may define a characteristic of the video by including information that specifies the type and/or the value of the characteristic of the video and/or is used to determine the type and/or the value of the characteristic of the video. Other types of characteristic information are contemplated.

The characteristic information may be stored within a single file or multiple files. The characteristic information may be stored with or separately from the video. The characteristic information may be stored as metadata of the video.

The music track component 106 may be configured to obtain music track information and/or other information. In some implementations, the music track component 106 may obtain music track information based on user interaction with a user interface/application (e.g., video editing application, video player application), and/or other information. For example, a user interface/application may provide option(s) for a user to play and/or edit videos. The music track information for a set of music tracks may be obtained based on the user's selection of the set of music track through the user interface/video application. For example, the user interface/video application may provide options to select among different sets of music tracks and the music track information for the user-selected set of music tracks may be obtained. As another example, different sets of music tracks may be associated with different styles of music, different styles of video edit, different songs, different activities, and/or different objects. The music track information for the set of music associated with a particular style of music, style of video edit, song, activity, and/or object (e.g., selected by the user through the user interface/video application) may be obtained. In some implementations, the music track information for a set of music tracks may be obtained based on the video and/or other information. The video may be analyzed to identify a particular type of music for the video, and a set of music tracks for the identified type of music may be obtained. Other selections of a set of music tracks for retrieval of music track information are contemplated.

The music track information may define one or more sets of music tracks. A set of music tracks may include multiple music tracks. A music track may refer to a piece of music. A music track may refer to a discrete piece of audio recording and/or information (e.g., MIDI data) to generate a discrete piece of audio recording. A music track may include one or more instrumental sounds, one or more vocal sounds, and/or other sounds. A music track may include sounds from a single instrument or a single voice. A music track may include sounds from multiple instruments and/or multiple voices. A set of music tracks may include music tracks of different types (e.g., music tracks with different intensity, speed, composition). Different sets of music may include different music tracks to enable generation of different types of accompaniment for the video. For example, different sets of music may include different music tracks to enable generation of different accompaniment for different styles of video edit. In some implementations, individual music tracks in a set of music tracks may be generated from a piece of music. For example, different parts of a song may be separated into different music tracks.

The music tracks in the set of music tracks may include looping music tracks. A looping music track may refer to a music track that can be played continuously by looping to the beginning of the music track once the end of the music track is reached. A looping music track may refer to a music track that can be repeated to create a continuous musical pattern. A looping music track may refer to a music track that can be repeated without any break/noticeable indication of repetition in the playback.

The music tracks in the set of music tracks may include compatible music tracks. A compatible music track may refer to a music track that can be played with other music tracks without disrupting the flow of the music playback. A compatible music track may refer to a music track that can be played with other music tracks to generate cohesive music playback. A compatible music track may refer to a music track that can be played before or after another music track. A compatible music track may refer to a music track that can be played at the same time as another music track.

In some implementations, a music track may be associated with one or more music elements. A music element may refer to a particular section of music. A music element may refer to a type of music to be included in an accompaniment for a video. Different music elements may provide different sounds/feel to different parts of an accompaniment for a video. An accompaniment for a video may include an arrangement of different music elements. Examples of music element include intro, outro, verse, chorus, bridge, drop, break, hook, and refrain. Other types of music element are contemplated.

Figures 3A, 3B:
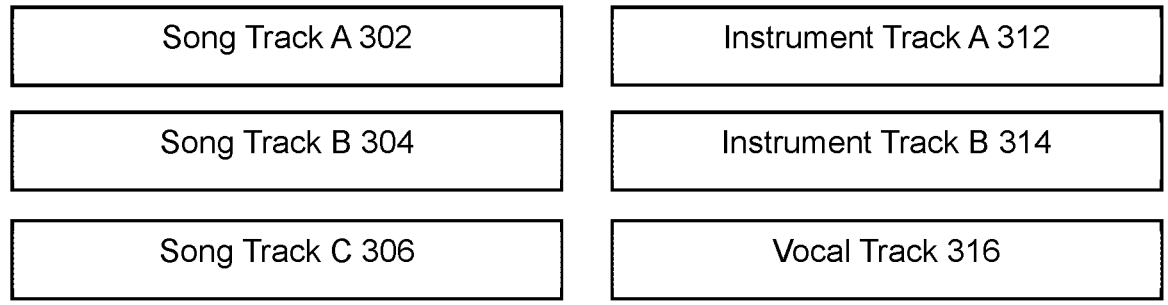
FIG. 3A illustrates example music tracks.
FIG. 3B illustrates example music tracks.
Figure 3C:
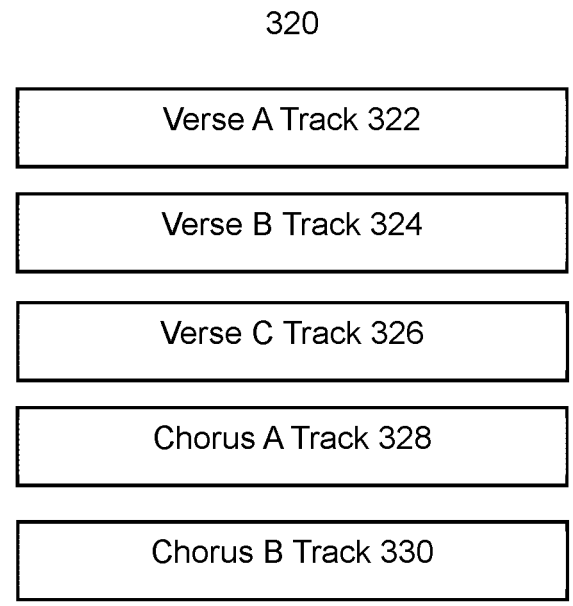
FIG. 3C illustrates example music tracks.

FIGS. 3A, 3B, and 3C illustrates example music tracks. In FIG. 3A, a set of music 300 may include a song track A 302, a song track B 304, and a song track C 306. The song track A 302, the song track B 304, and the song track C 306 may include different parts of a song. For example, different parts of a song may be separated into the song track A 302, the song track B 304, and the song track C 306. In FIG. 3B, a set of music 310 may include an instrument track A 312, an instrument track B 314, and a vocal track 316. The instrument track A 312 and the instrument track B 314 may include recording of different instruments. The vocal track 316 may include recording of one or more voices. Individual tracks shown in FIGS. 3A and 3B may be associated with one or more music elements. In FIG. 3C, a set of music may include a verse A track 322, a verse B track 324, a verse C track 326, a chorus A track 328, and a chorus B track 330. The verse A track 322, the verse B track 324, and the verse C track 326 may be associated with the musical structure of verse. The verse A track 322, the verse B track 324, and the verse C track 326 may be selected to be played for one or more verse parts of an accompaniment for a video. The chorus A track 328 and the chorus B track 330 may be selected to be played for one or more chorus parts of an accompaniment for a video. Other types of set of music tracks and other types of music tracks are contemplated.

The music track information define a set of music tracks by characterizing, describing, identifying, quantifying, reflecting, and/or otherwise defining the set of music tracks. The video information may define a set of music tracks by including information that defines one or more content, qualities, attributes, features, and/or other aspects of the set of music tracks/music tracks in the set of music tracks. For example, the music track information may define a set of music tracks by including information that makes up the content of the set of music tracks and/or information that is used to determine the content of the set of music tracks. Other types of music track information are contemplated.

The music track information may be stored within a single file or multiple files. For example, the music track information defining a set of music tracks may be stored within a music file, multiple music files, a combination of different files, and/or other files. The music track information may be stored in one or more formats or containers.

The selection component 108 may be configured to select multiple music tracks from the set(s) of music tracks. Selecting a music track may include ascertaining, choosing, determining, establishing, finding, identifying, obtaining, picking, setting, and/or otherwise selecting the music track. The multiple music tracks may be selected for inclusion in an accompaniment for the video. The multiple music tracks may be selected based on the characteristic(s) of the video and/or other information. The characteristic(s) of the video may be used to create the arrangement of the music to provide accompaniment for the video. The characteristic(s) of the video may be used to select the music tracks for the arrangement of the music such that the arrangement matches the characteristic(s) of the video. The characteristic(s) of the video may be used to determine which music elements are to be included in the accompaniment, which music tracks will be assigned to the music elements, the ordering of the music elements/music tracks in the accompaniment, the length of the music elements/music tracks in the accompaniment, the intensity of the music elements/music tracks in the accompaniment, and/or other aspects of the music elements/music tracks in the accompaniment.

Selection of multiple music tracks from the set(s) of music tracks may take one or more constraints into consideration. For example, music track selection may take into account one or more of the following: (1) changes in the accompaniment for the video (music evolution) should globally match changes in the video (video evolution); (2) changes between music elements/music tracks in the accompaniment for the video should match changes in the characteristic(s) of the video (e.g., changes between music tracks should match changes in image capture device motion, brightness of the visual content, intensity of the audio content); and (3) music in the accompaniment should be continuous (e.g., music tracks should be played through their lengths). Use of other constraints are contemplated.

Different music tracks may be selected for different temporal parts of the video. Different music tracks may be selected for the same temporal parts of the video. For example, music tracks may be selected so that the accompaniment for the video plays different music tracks at different moments in the video. Music tracks may be selected so that the accompaniment for the video plays multiple music tracks at one or more moments in the video. Music tracks may be layered on top of each other. Music tracks may be selected to start at a particular moment in the video and stop at another moment in the video. Music tracks may be selected to generate a particular type of music track. Music tracks may be selected to generate a music track for a particular music element. Different rules for selecting and/or combining music tracks may be used to generate music tracks for different music elements.

In some implementations, selection of the multiple music tracks from the set of music tracks based on the characteristic(s) of the video may include: (1) assignment of music elements to different parts of the progress length of the video based on the characteristic(s) of the video corresponding to the different parts of the progress length of the video; and (2) selection of a given music track for a given part of the progress length of the video based on a given music element assigned to the given part of the progress length of the video and/or other information. The characteristic(s) of the video may be used to assign music elements to different temporal parts of the video, and the music tracks may be selected for different temporal parts of the video based on the assigned music elements. In some implementations, changes in the assigned music elements may occur at beats of the music.

Figure 4:
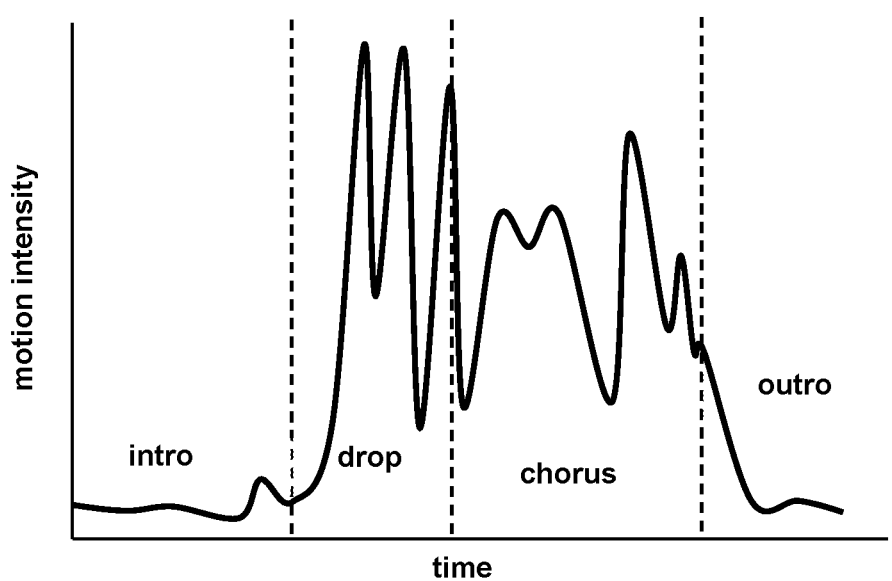
FIG. 4 illustrates example motion intensity for a video.

For example, FIG. 4 illustrates assignment of music elements to different temporal parts of a video based on motion intensity of the video. The music elements may be assigned to match changes in the motion intensity of the video. In FIG. 4, four temporal parts of the video may be assigned as (1) intro, (2) drop, (3) chorus, and (4) outro based on the motion intensity of the corresponding temporal parts of the video. After the assignments of the music elements, music tracks may be selected to fill the temporal parts of the video. The music tracks may be selected based on the assigned music elements. For the temporal part assigned as "intro," one or more music tracks associated with "intro" music element may be selected. For the temporal part assigned as "intro," one or more music tracks may be selected to generate "intro" music track. For the temporal part assigned as "drop," one or more music tracks associated with "drop" music element may be selected. For the temporal part assigned as "drop," one or more music tracks may be selected to generate "drop" music track. For the temporal part assigned as "chorus," one or more music tracks associated with "chorus" music element may be selected. For the temporal part assigned as "chorus," one or more music tracks may be selected to generate "chorus" music track. For the temporal part assigned as "outro," one or more music tracks associated with "outro" music element may be selected. For the temporal part assigned as "outro," one or more music tracks may be selected to generate "outro" music track.

In some implementations, a music track for a part of the progress length of the video may be selected further based on a length of the part of the progress length of the video. Music track selection may be performed based on the duration of the temporal part of the video to be filled, the length of the music tracks, and/or other information. A music track may be selected so that it is not cut off during the middle of the playback. A music track may be selected so that a single playback or multiple playback of the music track fill the temporal part of the video. For example, a temporal part of the video may have the length to include sixteen beats of music. Music track selection for this temporal part of the video may be restricted to music tracks that are not longer than sixteen beats. Music track selection for this temporal part of the video may be restricted to music tracks with lengths that are factors of sixteen (e.g., two beats, three beats, four beats, eight beats).

In some implementations, selection of a music track for a part of the progress length of the video may include: assignment of the track for the part of the progress length of the video; assignment of a duration for which the music track is to be played; and assignment of an intensity with which the music track is to be played. When a music track is selected for a temporal part of the video, the music track may be identified, the duration of music track playback may be set, and the intensity (e.g., volume, amplitude) of the music track playback may be set.

Figure 5:
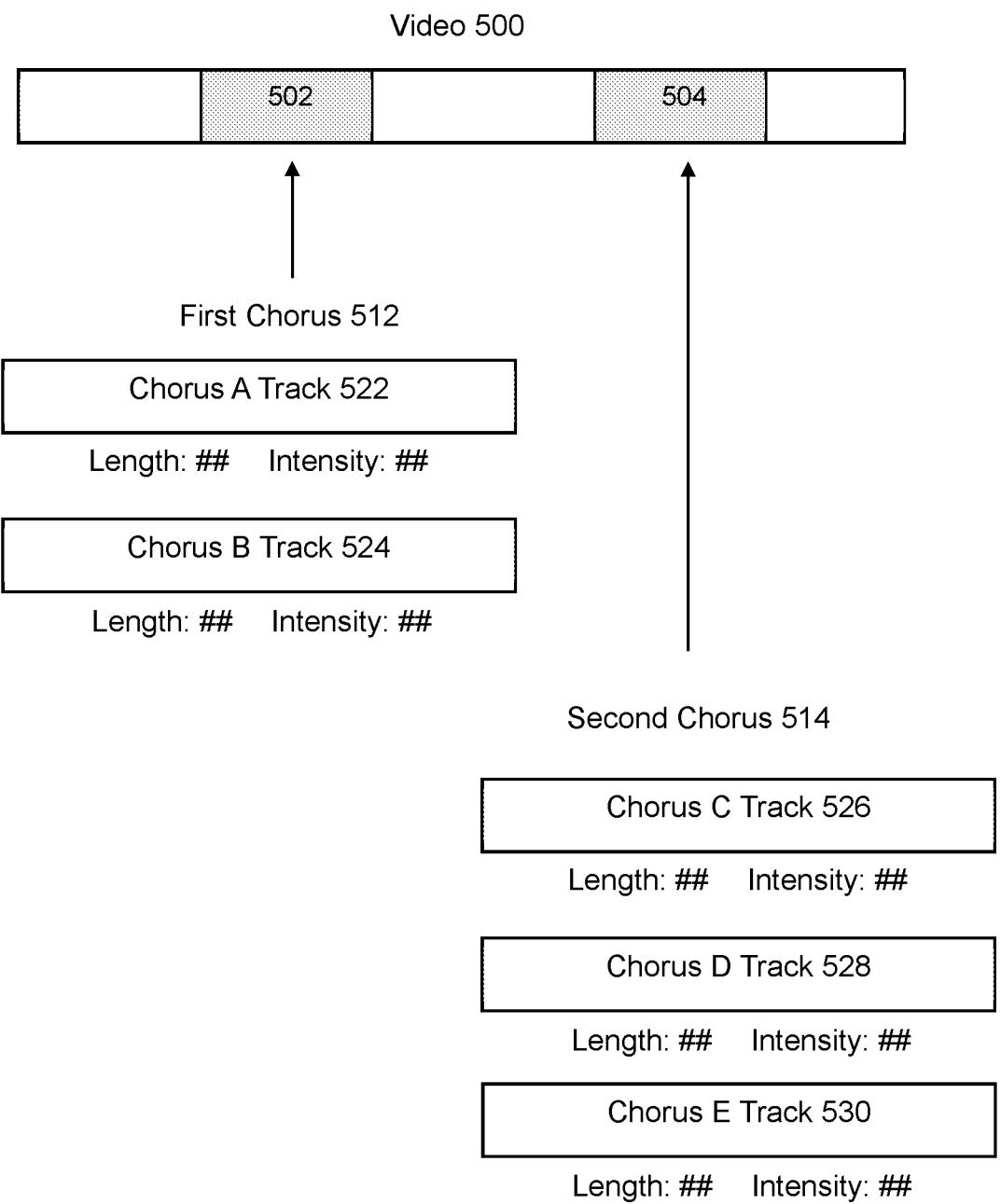
FIG. 5 illustrates example selection of music tracks for a video.

For example, FIG. 5 illustrates example selection of music tracks for a video 500. Two temporal parts 502, 504 of the video may be assigned with the music element of chorus. A chorus A track 522 and a chorus B track 524 may be assigned to the first chorus 512. The chorus A track 522 and the chorus B track 524 may be assigned to the first chorus 512 based on (1) the assignment of chorus music element to the temporal part 502 of the video, (2) the length of the temporal part 502 of the video, and (3) the lengths of the chorus A track 522 and the chorus B track 524. The chorus A track 522 and the chorus B track 524 may be assigned to be played at the same time and/or sequentially. The chorus A track 522 may be assigned with the length of playback (e.g., number of beats to be played, number of seconds to be played) and the intensity of playback (e.g., a value ranging between 0 and 1, with 0 being quietest playback and 1 being loudest playback). The chorus B track 522 may be assigned with the length of playback and the intensity of playback.

A chorus C track 526, a chorus D track 528, and a chorus E track 530 may be assigned to the second chorus 514. The chorus C track 526, the chorus D track 528, and the chorus E track 530 may be assigned to the second chorus 514 based on (1) the assignment of chorus music element to the temporal part 504 of the video, (2) the length of the temporal part 504 of the video, and (3) the lengths of the chorus C track 526, the chorus D track 528, and the chorus E track 530. The chorus C track 526, the chorus D track 528, and the chorus E track 530 may be assigned to be played at the same time and/or sequentially. The chorus C track 526 may be assigned with the length of playback and the intensity of playback. The chorus D track 528 may be assigned with the length of playback and the intensity of playback. The chorus E track 530 may be assigned with the length of playback and the intensity of playback.

In some implementations, one or more effects may be included in the video and/or the accompaniment for the video based on the characteristic(s) of the video and/or other information. The characteristic(s) of the video may be used to determine what effect(s) are included in the video/accompaniment, where in the temporal length of the video/accompaniment the effect(s) are included, and/or the intensity/duration of the effect(s). For example, referring to FIG. 4, effects may be selected for inclusion in the temporal parts of the video corresponding to peaks in the motion intensity of the video.

An effect may change visual, audio, and/or temporal characteristic(s) of the video. An effect may include an audio effect, a visual effect, and/or a temporal effect, An audio effect may refer to an effect that changes audio characteristic(s) of the video (e.g., characteristic(s) of the audio content of the video) and/or audio characteristic(s) of the accompaniment for the video. A visual effect may refer to an effect that changes visual characteristic(s) of the video (e.g., characteristic(s) of the visual content of the video). A temporal effect may refer to an effect that changes temporal characteristic(s) of the video and/or temporal characteristic(s) of the accompaniment for the video (e.g., changing timing characteristics/perceived speed of the video/accompaniment). For example, stutter effects, rhythmic resampling, silences, equalizer filtering, sample insertion, and/or other types of effects may be added to the video/the accompaniment for the playback. Other types of effects are contemplated.

The generation component 110 may be configured to generate the accompaniment for the video. Generating an accompaniment for the video may include assembling, constructing, creating, making, playing, producing, storing, and/or otherwise generating the accompaniment for the video. An accompaniment for the video may refer to music (e.g., soundtrack) to be played during playback of the video. An accompaniment for the video may be played with the visual content of the video. An accompaniment for the video may be played with the audio content of the video. An accompaniment for the video may replace the audio content of the video.

The accompaniment for the video may be generated to include the selected music tracks and/or other music tracks. The accompaniment for the video may be generated with the selected music tracks arranged based on the music elements assigned to different parts of the video. The accompaniment for the video may be generated to include one or more audio effects. The audio effect(s) may highlight different moments (e.g., interesting moments, high action moments) in the video. The accompaniment for the video may provide music/sound for the entire progress length of the video or for one or more portions of the progress length of the video.

The accompaniment for the video may be stored separately from the video or combined with the video. For example, the accompaniment for the video may be stored as a music file to be opened during playback of the video or stored in one or more audio tracks of the video. A new video file may be generated to include both the original video and the accompaniment for the video.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
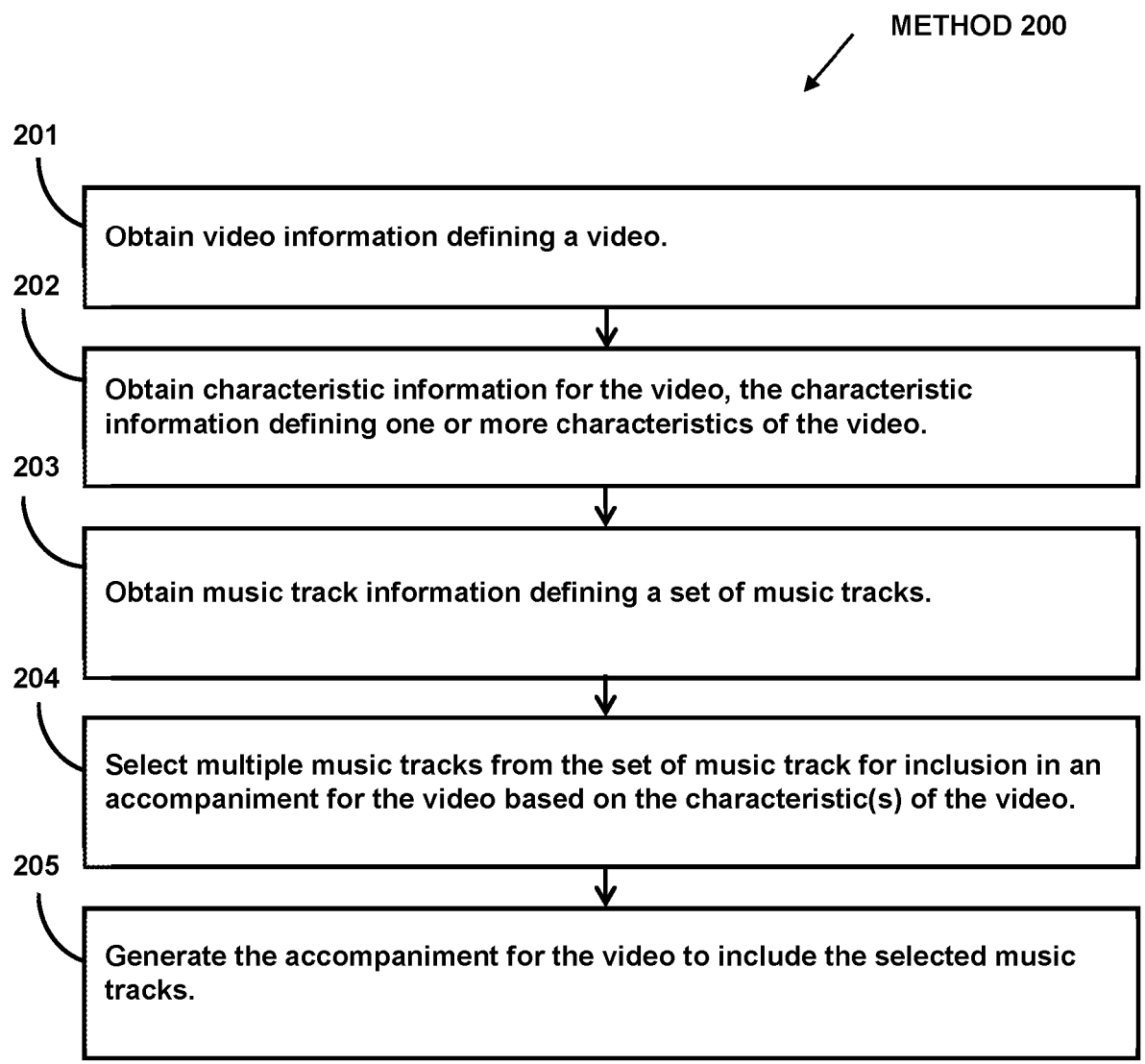
FIG. 2 illustrates an example method for dynamically generating music for videos.

FIG. 2 illustrates method 200 for dynamically generating music for videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may have a progress length. The video may include visual content viewable as a function of progress through the progress length of the video. In some implementations, operation 201 may be performed by a processor component the same as or similar to the video component 102 (Shown in FIG. 1 and described herein).

At operation 202, characteristic information may be obtained. The characteristic information for the video may define one or more characteristics of the video. In some implementations, operation 202 may be performed by a processor component the same as or similar to the video characteristic component 104 (Shown in FIG. 1 and described herein).

At operation 203, music track information may be obtained. The music track information may define a set of music tracks. In some implementations, operation 203 may be performed by a processor component the same as or similar to the music track component 106 (Shown in FIG. 1 and described herein).

At operation 204, multiple music tracks may be selected from the set of music track for inclusion in an accompaniment for the video. The multiple music tracks may be selected from the set of music track based on the characteristic(s) of the video and/or other information. In some implementations, operation 204 may be performed by a processor component the same as or similar to the selection component 108 (Shown in FIG. 1 and described herein).

At operation 205, the accompaniment for the video may be generated to include the selected music track. In some implementations, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamically generating music for videos, the system comprising:
one or more physical processors configured by machine-readable instructions to:
obtain video information defining a video, the video having a progress length, the video including visual content viewable as a function of progress through the progress length;
obtain characteristic information for the video, the characteristic information defining one or more characteristics of the video;
obtain music track information defining a set of music tracks, wherein an individual music track is associated with a specific section of music, different sections of music including intro, outro, verse, chorus, bridge, drop, break, hook and/or refrain, the set of music tracks including a first music track associated with a first section of music and a second music track associated with a second section of music different from the first section of music, the first music track being a looping music track;
assign sections of music to different parts of the progress length of the video based on the one or more characteristics of the video corresponding to the different parts of the progress length of the video, wherein the first section of music is assigned to a first part of the progress length of the video based on the one or more characteristics of the video corresponding to the first part of the progress length of the video and the second section of music is assigned to a second part of the progress length of the video based on the one or more characteristics of the video corresponding to the second part of the progress length of the video;
select multiple music tracks from the set of music track for inclusion in an accompaniment for the video based on the sections of the music assigned to the different parts of the progress length of the video, wherein the first music track is selected for the first part of the progress length of the video based on the first section of music assigned to the first part and the second music track is selected for the second part of the progress length of the video based on the second section of music assigned to the second part, further wherein, based on the first music track being the looping music track, the first music track is selected for the first part of the progress length of the video further based on the first music track having a length that is a factor of a length of the first part of the progress length of the video, wherein multiple loops of the first music track fill the first part of the progress length of the video; and
generate the accompaniment for the video to include the selected music tracks.

2. The system of claim 1, wherein:
the one or more characteristics of the video include motion intensity of an image capture device during capture of the video, the motion intensity of the image capture device during the capture of the video determined based on values of acceleration of the image capture device during the capture of the video; and
the selection of the given music track for the given part of the progress length of the video includes:
assignment of the given music track for the given part of the progress length of the video; and
assignment of an intensity with which the given music track is to be played.

3. A system for dynamically generating music for videos, the system comprising:
one or more physical processors configured by machine-readable instructions to:
obtain video information defining a video, the video having a progress length, the video including visual content viewable as a function of progress through the progress length;
obtain characteristic information for the video, the characteristic information defining one or more characteristics of the video;
obtain music track information defining a set of music tracks, wherein an individual music track is associated with a specific section of music, the set of music tracks including a first music track associated with a first section of music and a second music track associated with a second section of music different from the first section of music;
assign sections of music to different parts of the progress length of the video based on the one or more characteristics of the video corresponding to the different parts of the progress length of the video, wherein the first section of music is assigned to a first part of the progress length of the video based on the one or more characteristics of the video corresponding to the first part of the progress length of the video and the second section of music is assigned to a second part of the progress length of the video based on the one or more characteristics of the video corresponding to the second part of the progress length of the video;
select multiple music tracks from the set of music track for inclusion in an accompaniment for the video based on the sections of the music assigned to the different parts of the progress length of the video, wherein the first music track is selected for the first part of the progress length of the video based on the first section of music assigned to the first part and the second music track is selected for the second part of the progress length of the video based on the second section of music assigned to the second part; and
generate the accompaniment for the video to include the selected music tracks.

4. The system of claim 3, wherein different sections of music include intro, outro, verse, chorus, bridge, drop, break, hook and/or refrain.

5. The system of claim 3, wherein:
the set of music tracks further includes a third music track associated with the first section of music;
the third music track is also selected for the first part of the progress length of the video based on the first section of music assigned to the first part; and
the accompaniment for the video includes the first music track and the third music track played at the same time for the first part of the progress length of the video.

6. The system of claim 3, wherein;
a given music track selected for a given part of the progress length of the video includes a looping music track; and the looping music track is selected for the given part of the progress length of the video further based on a length of the given part of the progress length of the video.

7. The system of claim 3, wherein selection of a given music track for a given part of the progress length of the video includes:
assignment of the given music track for the given part of the progress length of the video; and
assignment of an intensity with which the given music track is to be played.

8. The system of claim 6, wherein the selection of the looping music track for the given part of the progress length of the video further based on the length of the given part of the progress length of the video includes selection of the looping music track based on the looping music track having a length that is a factor of the length of the given part of the progress length of the video to which the looping music is assigned, further wherein multiple loops of the looping music track fill the given part of the progress length of the video.

9. The system of claim 3, wherein the one or more characteristics of the video include motion intensity of an image capture device during capture of the video.

10. The system of claim 9, wherein the motion intensity of the image capture device during the capture of the video is determined based on values of acceleration of the image capture device during the capture of the video.

11. The system of claim 3, wherein one or more audio effects are included in the video and/or the accompaniment for the video based on the one or more characteristics of the video.

12. A method for dynamically generating music for videos, the method performed by a computing system including one or more processors, the method comprising:
obtaining, by the computing system, video information defining a video, the video having a progress length, the video including visual content viewable as a function of progress through the progress length;
obtaining, by the computing system, characteristic information for the video, the characteristic information defining one or more characteristics of the video;
obtaining, by the computing system, music track information defining a set of music tracks, wherein an individual music track is associated with a specific section of music, the set of music tracks including a first music track associated with a first section of music and a second music track associated with a second section of music different from the first section of music;
assigning, by the computing system, sections of music to different parts of the progress length of the video based on the one or more characteristics of the video corresponding to the different parts of the progress length of the video, wherein the first section of music is assigned to a first part of the progress length of the video based on the one or more characteristics of the video corresponding to the first part of the progress length of the video and the second section of music is assigned to a second part of the progress length of the video based on the one or more characteristics of the video corresponding to the second part of the progress length of the video;
selecting, by the computing system, multiple music tracks from the set of music track for inclusion in an accompaniment for the video based on the sections of the music assigned to the different parts of the progress length of the video, wherein the first music track is selected for the first part of the progress length of the video based on the first section of music assigned to the first part and the second music track is selected for the second part of the progress length of the video based on the second section of music assigned to the second part; and
generating, by the computing system, the accompaniment for the video to include the selected music tracks.

13. The method of claim 12, wherein different sections of music include intro, outro, verse, chorus, bridge, drop, break, hook and/or refrain.

14. The method of claim 12, wherein:
the set of music tracks further includes a third music track associated with the first section of music;
the third music track is also selected for the first part of the progress length of the video based on the first section of music assigned to the first part; and
the accompaniment for the video includes the first music track and the third music track played at the same time for the first part of the progress length of the video.

15. The method of claim 12, wherein:
a given music track selected for a given part of the progress length of the video includes a looping music track; and
the looping music track is selected for the given part of the progress length of the video further based on a length of the given part of the progress length of the video.

16. The method of claim 12, wherein selecting a given music track for a given part of the progress length of the video includes:
assigning the given music track for the given part of the progress length of the video; and
assigning an intensity with which the given music track is to be played.

17. The method of claim 15, wherein the selection of the looping music track for the given part of the progress length of the video further based on the length of the given part of the progress length of the video includes selection of the looping music track based on the looping music track having a length that is a factor of the length of the given part of the progress length of the video to which the looping music is assigned, further wherein multiple loops of the looping music track fill the given part of the progress length of the video.

18. The method of claim 12, wherein the one or more characteristics of the video include motion intensity of an image capture device during capture of the video.

19. The method of claim 18, wherein the motion intensity of the image capture device during the capture of the video is determined based on values of acceleration of the image capture device during the capture of the video.

20. The method of claim 12, wherein one or more audio effects are included in the video and/or the accompaniment for the video based on the one or more characteristics of the video.

* * * * *